United States Patent
Quach et al.

(10) Patent No.: US 10,247,011 B2
(45) Date of Patent: Apr. 2, 2019

(54) GAS TURBINE ENGINE COMPONENT WITH INCREASED COOLING CAPACITY

(71) Applicant: United Technologies Corporation, Hartford, CT (US)

(72) Inventors: San Quach, East Hartford, CT (US); Christopher King, Bristol, CT (US); Thomas N. Slavens, Vernon, CT (US)

(73) Assignee: United Technologies Corporation, Farmington, CT (US)

( * ) Notice: Subject to any disclaimer, the term of this patent is extended or adjusted under 35 U.S.C. 154(b) by 662 days.

(21) Appl. No.: 14/923,553

(22) Filed: Oct. 27, 2015

(65) Prior Publication Data

US 2016/0169005 A1 Jun. 16, 2016

Related U.S. Application Data

(60) Provisional application No. 62/091,662, filed on Dec. 15, 2014.

(51) Int. Cl.
*F01D 5/18* (2006.01)
*F01D 5/02* (2006.01)
(Continued)

(52) U.S. Cl.
CPC .............. *F01D 5/187* (2013.01); *F01D 5/02* (2013.01); *F01D 5/186* (2013.01); *F01D 9/041* (2013.01);
(Continued)

(58) Field of Classification Search
CPC . F01D 11/08; F01D 25/12; F01D 5/02; F01D 5/186; F01D 5/187; F01D 9/041;
(Continued)

(56) References Cited

U.S. PATENT DOCUMENTS

| 3,527,543 A | * | 9/1970 | Howald | F01D 5/186 415/115 |
| 4,726,735 A | * | 2/1988 | Field | F01D 5/186 415/115 |

(Continued)

FOREIGN PATENT DOCUMENTS

| EP | 0959228 A1 | 11/1999 |
| EP | 0965728 A2 | 12/1999 |
| EP | 2230383 A1 | 9/2010 |

OTHER PUBLICATIONS

European Search Report for European Application No. 15200219.2 dated May 18, 2016.

*Primary Examiner* — William M McCalister
(74) *Attorney, Agent, or Firm* — Carlson, Gaskey & Olds, P.C.

(57) ABSTRACT

A cooling circuit for a gas turbine engine comprises a gas turbine engine component having a body with at least one internal cavity defined by a cavity wall. A plurality of cooling holes formed within the cavity wall, wherein each cooling hole is defined by a length extending from a cooling hole inlet to a cooling hole outlet, and wherein the cooling holes are positioned relative to each other such that a minimum allowable ligament distance is maintained between adjacent cooling holes along the entire length of each cooling hole. A gas turbine engine and a method of forming a cooling circuit for a gas turbine engine are also disclosed.

20 Claims, 3 Drawing Sheets

(51) Int. Cl.
  *F01D 9/04* (2006.01)
  *F02C 3/04* (2006.01)
  *F02C 7/18* (2006.01)
  *F23R 3/00* (2006.01)
  *F01D 11/08* (2006.01)
  *F01D 25/12* (2006.01)

(52) U.S. Cl.
  CPC .............. *F01D 11/08* (2013.01); *F01D 25/12* (2013.01); *F02C 3/04* (2013.01); *F02C 7/18* (2013.01); *F23R 3/002* (2013.01); *F05D 2220/32* (2013.01); *F05D 2230/10* (2013.01); *F05D 2240/12* (2013.01); *F05D 2240/30* (2013.01); *F05D 2240/307* (2013.01); *F05D 2240/35* (2013.01); *F05D 2250/231* (2013.01); *F05D 2250/232* (2013.01); *F05D 2260/202* (2013.01); *Y02T 50/676* (2013.01)

(58) Field of Classification Search
  CPC .......... F02C 3/04; F02C 7/18; F05D 2220/32; F05D 2230/10; F05D 2240/12; F05D 2240/30; F05D 2240/307; F05D 2240/35; F05D 2250/231; F05D 2250/232; F05D 2260/202; F23R 3/002; Y02T 50/676
  See application file for complete search history.

(56) References Cited

U.S. PATENT DOCUMENTS

| | | | | |
|---|---|---|---|---|
| 4,738,588 A * | 4/1988 | Field | ........................ | F01D 5/186 415/115 |
| 5,241,827 A * | 9/1993 | Lampes | .................. | F01D 5/184 60/754 |
| 5,261,223 A * | 11/1993 | Foltz | ........................ | F23R 3/002 60/757 |
| 5,279,127 A * | 1/1994 | Napoli | .................... | F02K 1/822 60/754 |
| 5,307,637 A * | 5/1994 | Stickles | .................. | F23R 3/002 60/756 |
| 5,465,572 A * | 11/1995 | Nicoll | ..................... | F02K 1/822 60/266 |
| 5,533,864 A * | 7/1996 | Nomoto | .................. | F01D 5/186 415/115 |
| 5,720,434 A * | 2/1998 | Vdoviak | .................. | F02K 1/12 239/127.1 |
| 5,813,836 A | 9/1998 | Starkweather | | |
| 6,287,075 B1 | 9/2001 | Kercher | | |
| 6,383,602 B1 * | 5/2002 | Fric | ......................... | F01D 5/186 415/115 |
| 6,402,471 B1 | 6/2002 | Demers et al. | | |
| 6,435,813 B1 * | 8/2002 | Rieck, Jr. | ................ | F01D 5/188 415/115 |
| 6,568,187 B1 * | 5/2003 | Jorgensen | ............... | F01D 9/023 60/752 |
| 7,217,094 B2 | 5/2007 | Cunha et al. | | |
| 7,220,103 B2 | 5/2007 | Cunha et al. | | |
| 7,581,927 B2 | 9/2009 | Cunha | | |
| 8,083,485 B2 | 12/2011 | Chon et al. | | |
| 8,105,030 B2 | 1/2012 | Abdel-Messeh et al. | | |
| 8,366,393 B2 | 2/2013 | Tibbott | | |
| 2012/0087803 A1 | 4/2012 | Butler et al. | | |
| 2013/0280091 A1 | 10/2013 | Propheter-Hinckley et al. | | |
| 2014/0023497 A1 | 1/2014 | Giglio et al. | | |
| 2016/0076383 A1* | 3/2016 | Spangler | ................. | F01D 9/065 60/772 |
| 2016/0153282 A1* | 6/2016 | Spangler | ................. | F01D 5/186 415/1 |
| 2016/0169005 A1* | 6/2016 | Quach | ..................... | F01D 5/186 60/752 |

* cited by examiner

GAS TURBINE ENGINE COMPONENT WITH INCREASED COOLING CAPACITY

CROSS-REFERENCE TO RELATED APPLICATION

This application claims priority to U.S. Provisional Patent Application No. 62/091,662, filed Dec. 15, 2014.

STATEMENT REGARDING FEDERALLY SPONSORED RESEARCH OR DEVELOPMENT

This invention was made with government support under Contract No. N00019-12-D-0002, awarded by the United States Navy. The Government has certain rights in this invention.

BACKGROUND OF THE INVENTION

In pursuit of higher engine efficiencies, higher turbine inlet temperatures have been relied upon to boost overall engine performance. This can result in gas path temperatures that may exceed melting points of turbine component constituent materials. To address this issue, dedicated cooling air is extracted from a compressor section and is used to cool the gas path components in the turbine, such as rotating blades and stator vanes for example, incurring significant cycle penalties.

One method of cooling turbine airfoils utilizes internal cooling channels that include cooling holes to purge the cooling air. Typically, these cooling holes and significant cooling mass flow rates are required to provide the needed amount of cooling. In order to effectively cool the airfoils to protect against damage, there is a need to balance the amount of cooling flow used and the overall heat transfer capability. Some cooling channels have a very small surface area to receive the cooling holes. The cooling holes in these small areas provide an outlet to drive flow in the cavity for internal convection heat transfer and provide film cooling for the airfoil externally.

The small surface areas that are to include the cooling holes present manufacturing challenges. Prior configurations are limited by cooling hole manufacturing tolerances such as ligament distances between holes, sidewall distances between cavity sides, and backstrike distances. These tolerances only allow a few holes to be placed at these small cavity locations. Further, to pass the necessary amount of flow through the cavity, the diameters of the cooling holes had to be relatively large. This results in inefficient film cooling as film coverage is low.

SUMMARY OF THE INVENTION

In a featured embodiment, a cooling circuit for a gas turbine engine comprises a gas turbine engine component having a body with at least one internal cavity defined by a cavity wall. A plurality of cooling holes formed within the cavity wall, wherein each cooling hole is defined by a length extending from a cooling hole inlet to a cooling hole outlet, and wherein the cooling holes are positioned relative to each other such that a minimum allowable ligament distance is maintained between adjacent cooling holes along the entire length of each cooling hole.

In another embodiment according to the previous embodiment, the internal cavity is defined by a height and a width that is greater than the height. The height is within the range of 0.100-0.300 inches (2.54-7.62 mm). Each cooling hole has a diameter within a range of 0.010-0.030 inches (0.254-0.762 mm).

In another embodiment according to any of the previous embodiments, each cooling hole has a uniform shape.

In another embodiment according to any of the previous embodiments, the uniform shape comprises a cylindrical shape.

In another embodiment according to any of the previous embodiments, each cooling hole defines a hole center axis and wherein the center axes are parallel to each other.

In another embodiment according to any of the previous embodiments, each hole has a non-uniform shape.

In another embodiment according to any of the previous embodiments, the non-uniform shape comprises a first portion at the cooling hole inlet that is defined by a first cross-sectional area and a second portion at the cooling hole outlet that is defined by a second cross-sectional area greater than the first cross-sectional area.

In another embodiment according to any of the previous embodiments, each cooling hole defines a center axis, and wherein at least one center axis of one cooling hole is non-parallel to at least one center axis of another cooling hole.

In another embodiment according to any of the previous embodiments, the cooling hole inlet of at least one cooling hole is axially aligned with the cooling hole outlet of the at least one cooling hole.

In another embodiment according to any of the previous embodiments, the plurality of cooling holes includes at least a first row of cooling holes and a second row of cooling holes spaced from the first row of cooling holes.

In another embodiment according to any of the previous embodiments, at least one cooling hole in the first row of cooling holes is oriented to extend in a first direction and at least one cooling hole in the second row of cooling holes is orientated to extend in a second direction different than the first direction.

In another embodiment according to any of the previous embodiments, the minimum allowable ligament distance is at least 0.003 inches (0.076 mm) and not more than 0.050 inches (1.27 mm).

In another embodiment according to any of the previous embodiments, the gas turbine engine component comprises one of an airfoil, a blade, a vane, a BOAS, or a combustor panel.

In another featured embodiment, a gas turbine engine comprises a compressor section, a combustor section downstream of the compressor section, and a turbine section downstream of the combustor section. At least one of the combustor section and the turbine section include a component having a body with at least one internal cavity defined by a cavity wall, and a plurality of cooling holes formed within the cavity wall. Each cooling hole is defined by a length extending from a cooling hole inlet to a cooling hole outlet. The cooling holes are positioned relative to each other such that a minimum allowable ligament distance is maintained between adjacent cooling holes along the entire length of each cooling hole.

In another embodiment according to the previous embodiment, the minimum allowable ligament distance is at least 0.003 inches (0.076 mm) and not more than 0.050 inches (1.27 mm).

In another embodiment according to any of the previous embodiments, the component comprises an airfoil, a combustor panel, or BOAS.

In another embodiment according to any of the previous embodiments, the plurality of cooling holes includes at least a first row of cooling holes and a second row of cooling holes spaced from the first row of cooling holes, and wherein at least one cooling hole in the first row of cooling holes is oriented to extend in a first direction and at least one cooling hole in the second row of cooling holes is orientated to extend in a second direction different than the first direction.

In another embodiment according to any of the previous embodiments, each cooling hole comprises a first portion at the cooling hole inlet that is defined by a first cross-sectional area and a second portion at the cooling hole outlet that is defined by a second cross-sectional area greater than the first cross-sectional area In another featured embodiment, a method of forming a cooling circuit for a gas turbine engine comprises the steps of providing a gas turbine engine component having a body with at least one internal cavity defined by a cavity wall. A plurality of cooling holes are formed within the cavity wall. Each cooling hole is defined by a length extending from a cooling hole inlet to a cooling hole outlet. The cooling holes are formed relative to each other such that a minimum allowable ligament distance is maintained between adjacent cooling holes along the entire length of each cooling hole.

In another embodiment according to the previous embodiment, at least two rows of cooling holes are formed in the cavity wall.

The foregoing features and elements may be combined in any combination without exclusivity, unless expressly indicated otherwise.

These and other features may be best understood from the following drawings and specification.

DETAILED DESCRIPTION

Figure 1:
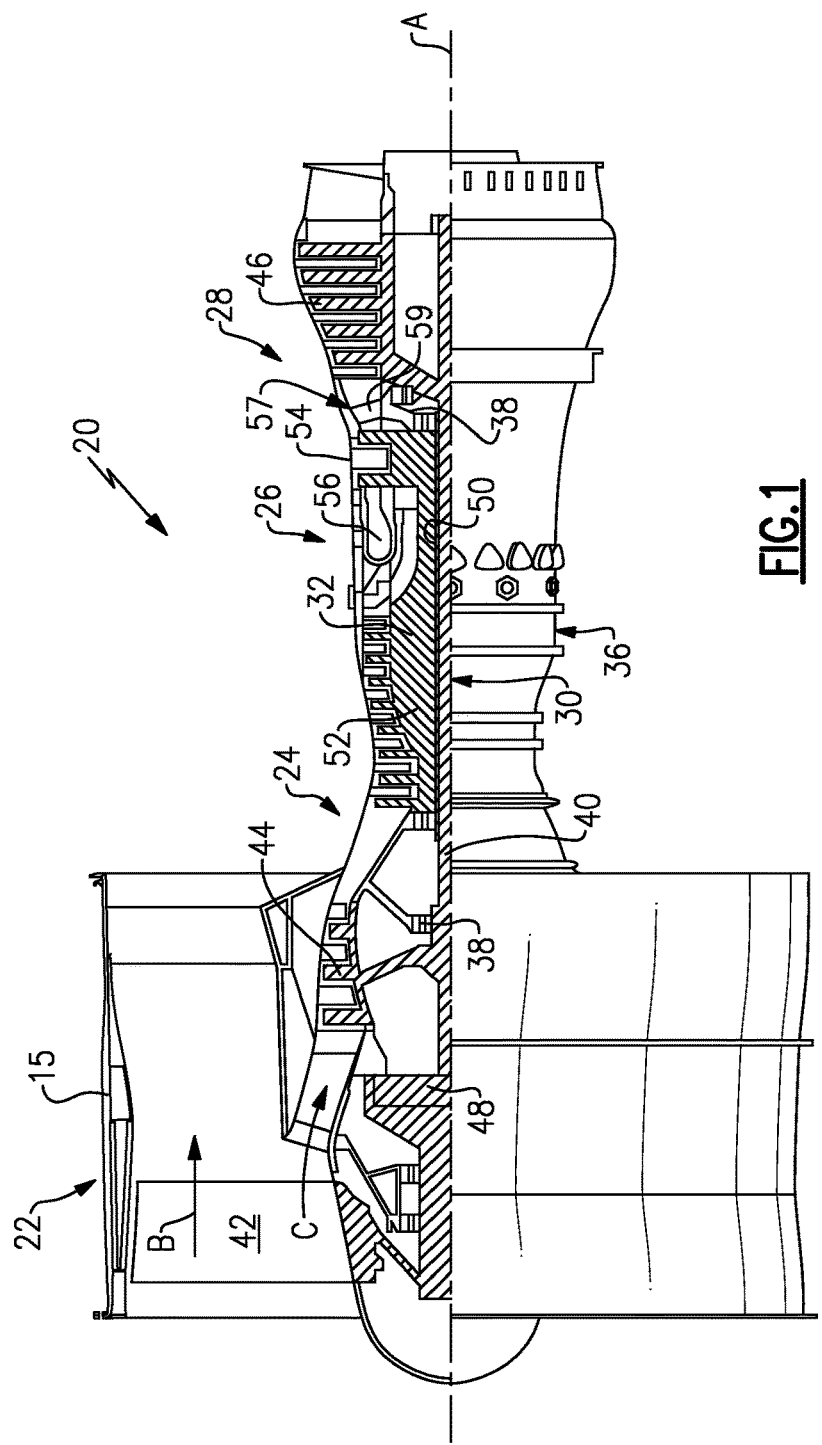
FIG. 1 is a schematic representation of one example of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFCT')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second.

Figure 2:
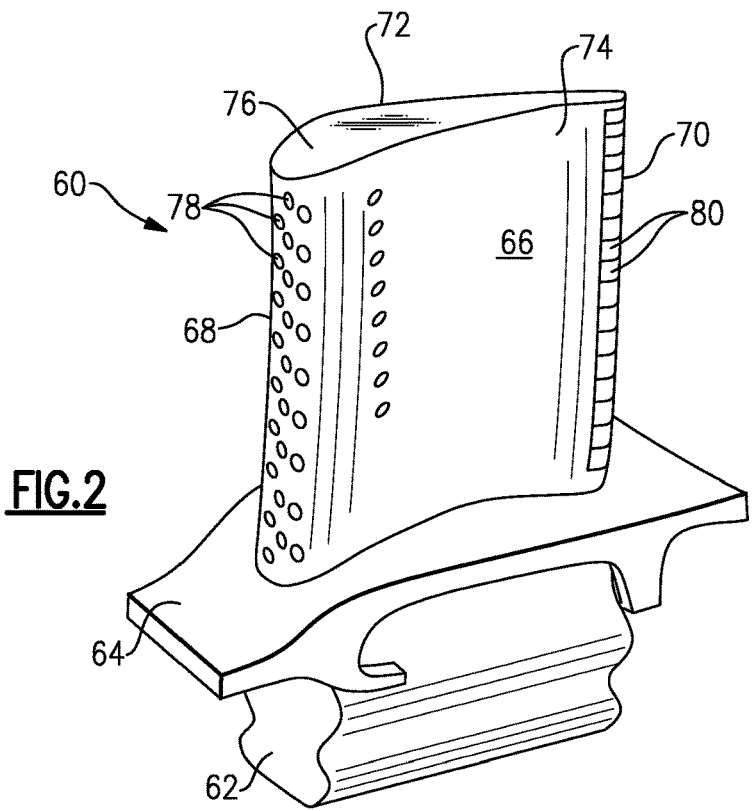
FIG. 2 is a side perspective view of a turbine blade.

Airfoils located downstream of combustor section 26, such as stator vanes and rotor blades in the turbine section 28 for example, operate in a high-temperature environment. Airfoils that are exposed to high temperatures typically include internal cooling channels that direct a flow of cooling air through the airfoil to remove heat and prolong the useful life of the airfoil. FIG. 2 is a side view of a turbine rotor blade 60 having a root section 62, a platform 64, and an airfoil section 66. Root section 62 is connected to a rotor in the turbine section 28 (FIG. 1) as known. The airfoil section 66 includes a leading edge 68, a trailing edge 70, a suction side wall 72, and a pressure side wall 74. The airfoil section 66 extends to a tip 76, and includes a plurality of surface cooling holes, such as film cooling holes 78, and a plurality of trailing edge cooling slots 80.

The platform 64 connects one end of airfoil section 66 to root section 62. The leading edge 68, trailing edge 70, suction side wall 72, and pressure side wall 74 extend outwardly away from the platform 64. The tip 76 closes off an opposite end of the airfoil section 66 from the platform 64. Suction side wall 72 and pressure side wall 74 connect leading edge 68 and trailing edge 70. Film cooling holes 78 are arranged over a surface of airfoil section 66 to provide a layer of cool air proximate the surface of airfoil section 66 for protection from high-temperature combustion gases. Trailing edge cooling slots 80 are arranged along trailing edge 70 to provide an exit for air circulating within airfoil section 66.

Figure 3:
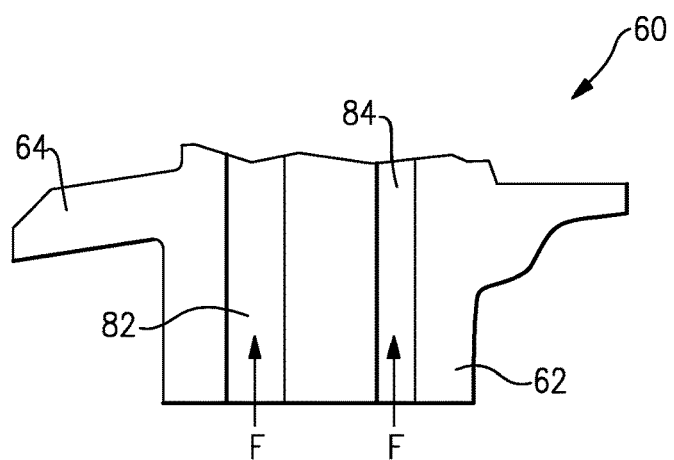
FIG. 3 is a schematic cross-sectional view of a root section of the blade of FIG. 2.

FIG. 3 is a schematic section view of the root section 62 of the rotor blade 60 of FIG. 2. The rotor blade 60 includes one or more internal cooling channels. In the example shown, there is at least a first cooling channel 82 near the leading edge 68, and a second cooling channel 84 positioned aft of the first cooling channel 82. The cooling channels 82, 84 direct cooling flow F radially outwardly toward the tip 76 of the blade 60. The cooling channels 82, 84 deliver cooling flow to the film cooling holes 78 and the cooling slots 80. The cooling channels internal to the airfoil section 66 can take various forms.

Figure 4A:
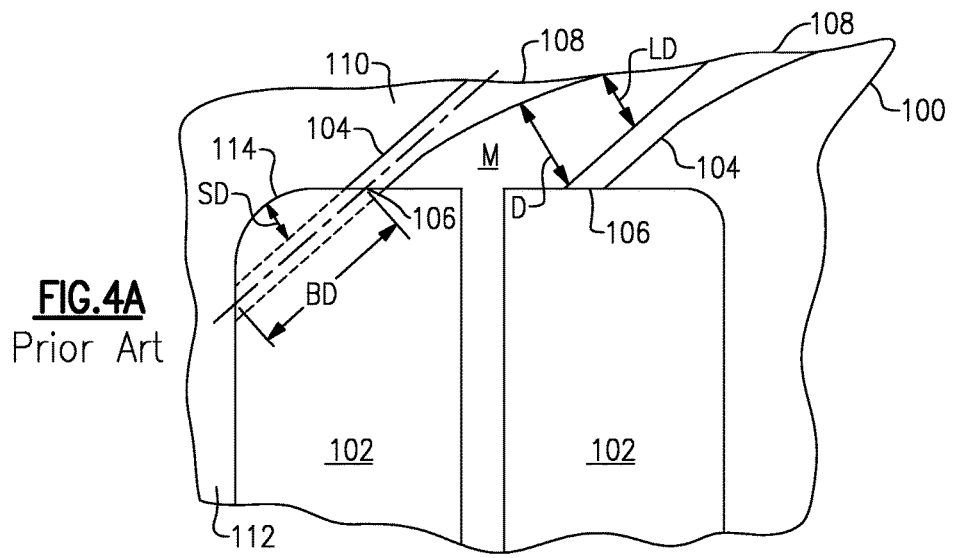
FIG. 4A is a schematic cross-sectional view of an internal cavity and cooling holes of a prior art component that shows tolerance distances that are checked to produce good cooling holes and ensure proper geometry.
Figure 4B:
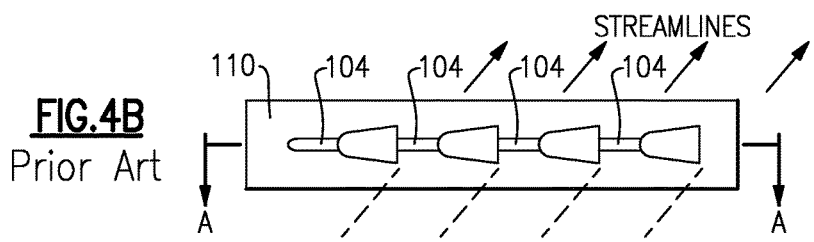
FIG. 4B is a schematic cross-sectional top view of a single row of holes as used in the prior art configuration of FIG. 4A.

FIGS. 4A-B show a known example of a gas turbine engine component 100 that includes at least one internal cooling channel or cavity 102 and a single row of cooling holes 104 that each have an inlet 106 and an outlet 108. Various manufacturing tolerances have to be maintained when drilling the holes 104 into a wall 110 of the cavity 102. For example, a minimum ligament distance LD at one point between two adjacent holes 104 is required to provide a sufficient amount of material such that the exits of two holes do not merge into each other, and instead define two discrete holes for cooling purposes while still providing sufficient structural integrity for the wall 110. Also, a backstrike distance BD must be maintained such that when a drill enters the cavity 102 the tip of the drill does not strike and weaken a back wall 112 of the cavity 102. The backstrike distance BD is measured from a location where the centerline of the hole first hits the wall 110 and ends at a location where the centerline of the hole hits the back wall 112 (see FIG. 4A). Finally, a sidewall clearance distance SD must be maintained such that the opening of the cooling hole 104 into the cavity 102 is fully maintained and does not interfere with a sidewall 114 of the cavity 102. Otherwise, the hole may miss the cavity 102 due to true positioning tolerances.

As shown in FIG. 4A, the distance D between adjacent holes 104 varies along the length of the hole 104. This provides a significant amount of excess material M between holes 104 resulting in cooling inefficiencies.

Figure 5:
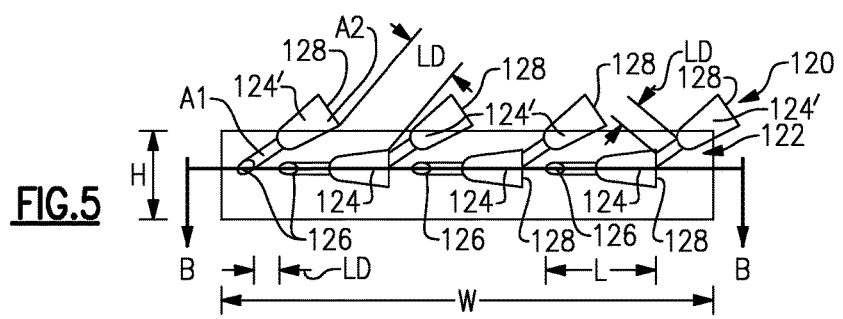
FIG. 5 is a schematic cross-sectional top view of an internal cavity and cooling holes in a gas turbine engine component.

The subject invention provides a configuration that significantly improves cooling capacity up to 100% compared to prior configurations. FIG. 5 shows an example of a gas turbine engine component 120 that includes at least one internal cavity 122 and a plurality of cooling holes 124 that each have an inlet 126 and an outlet 128. The gas turbine engine component 120 could comprise an airfoil for a blade such as that shown in FIG. 2-3, or could comprise a BOAS, a combustor liner, an airfoil for a vane, or any other gas turbine engine component that utilizes cooling holes.

Figure 6:
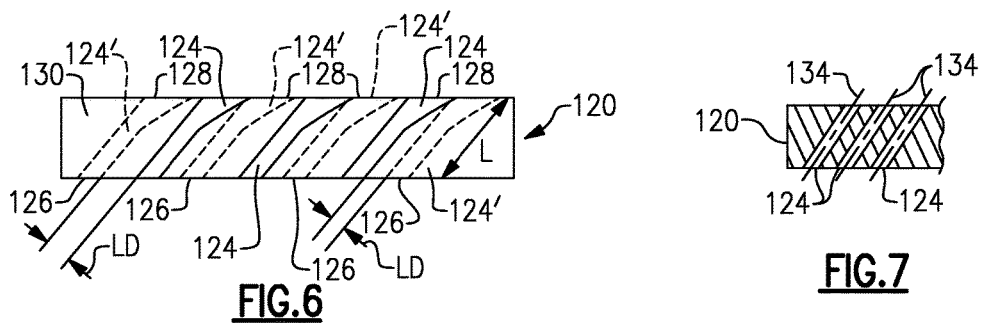
FIG. 6 is a section view of FIG. 5.

In the example shown in FIGS. 5-6, the cooling holes 124 are formed within a cavity wall 130 of a gas turbine engine component and are each defined by a length L extending from the cooling hole inlet 126 to the cooling hole outlet 128. In this configuration, the cooling holes 124 are positioned relative to each other such that a minimum allowable ligament distance LD is maintained between adjacent cooling holes 124 along the entire length L of each cooling hole 124, i.e. there is no extra material between adjacent cooling holes, as best shown in FIG. 6. As discussed above, the minimum ligament distance LD between two adjacent holes provides a sufficient amount of material such that the adjacent holes exits do not merge into each other, and instead define discrete holes for cooling purposes while still providing sufficient structural integrity for the wall within which the holes are formed. An added benefit is that for transverse flow directions, the cooling flow velocity vector differences between the exits for the holes 124 to the angled exits for holes 124' cause a surface vortex that inhibits kidney vortices around exits for holes ssss124'.

The internal cavity 122 is defined by a height H and a width W that is greater than the height H. In one example, the height H is within the range of 0.100-0.300 inches (2.54-7.62 mm), which defines a relatively small cavity 122 within the body of the component 120. As such, only a relatively small surface area is available to receive cooling holes. The small area makes it difficult to provide a large number of holes, or even more than one row of holes in certain configurations. By maintaining the minimum allowable ligament distance LD between adjacent cooling holes 124 along their entire length L the number of holes 124 that can be formed in the relative small surface are increases significantly. In one example, a range of allowable ligament distance LD is 0.003" (0.076 mm)<LD<0.050" (1.27 mm). Thus, this range is maintained between adjacent holes 124 along their entire lengths such that there is no more than 0.050" of material between the holes at any given point.

Further, by increasing the quantity of holes, the sizes can then be made smaller than in previous designs while passing the same mass flow. For example, cooling holes 124 having a diameter within a range of 0.010-0.030 inches (0.254-0.762 mm) can be used. This significantly increases the film cooling coverage and consequently the area-averaged film effectiveness.

Figure 7:
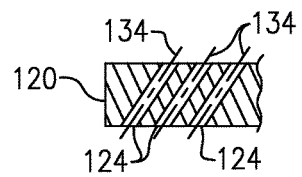
FIG. 7 is a schematic cross-sectional view of another example of a cooling hole shape.

In one example shown in FIG. 7, each cooling hole 124 can have a uniform shape such as a straight cylindrical shape for example. The cooling holes 124 each define a center axis 134. In this example, the center axes 134 are parallel to each other.

In the example shown in FIGS. 5-6, each hole has a non-uniform shape. For example, each hole 124 includes a first portion at the cooling hole inlet 126 that is defined by a first cross-sectional area A1 and a second portion at the cooling hole outlet 128 that is defined by a second cross-sectional area A2 greater than the first cross-sectional area. The second portion is often referred to as the diffuser portion of the cooling hole 124 as the wider area allows the cooling flow to spread out and more evenly disperse when exiting the hole 124.

In the example shown in FIGS. 5-6, two rows of cooling holes are shown in the component 120. Traditionally, in these small cavity areas of the component, only one row of cooling holes can be provided; however, by maintaining the minimum allowable ligament distance LD between adjacent cooling holes 124 along their entire length L, multiple rows of holes can be formed. As shown in FIGS. 5-6, there is a first row of cooling holes 124 (3 holes are shown as an example) and a second row of cooling holes 124' (4 holes are shown as an example), with the rows being spaced apart from each other. Each cooling hole 124, 124' defines a center axis, and in this example configuration, at least one center axis of one cooling hole 124' is non-parallel to at least one center axis of another cooling hole 124.

The cooling hole inlets 126 may or may not be aligned with the cooling hole outlets 128 along a common cooling hole axis. In the example shown, the cooling hole inlet 126 is aligned with the outlet 128 along the center axis. Also in this example, at least one cooling hole 124 in the first row of cooling holes is oriented to extend in a first direction and at least one cooling hole 124' in the second row of cooling holes is orientated to extend in a second direction different than the first direction.

The cooling holes are typically drilled into the component by processes such as EDM or laser drilling. The variations in these processes are what necessitated the concerns for backstrike, sidewall, and ligament distance clearances. Thus, one example method of forming the cooling circuit includes providing the gas turbine engine component 120 with a body having at least one internal cavity 122 defined by a cavity wall 130, forming a plurality of cooling holes 124 within the cavity wall 130 where each cooling hole 124 is defined by a length L extending from a cooling hole inlet 126 to a cooling hole outlet 128, and forming the cooling holes 124 relative to each other such that a minimum allowable ligament distance LD is maintained between adjacent cooling holes 124 along the entire length L of each cooling hole 124.

In one example, an additive manufacturing process is used to form the component 120 and cooling holes 124. An additive manufacturing process can, for example, create a negative for casting one or more features of the cooling circuit. Using an additive process to create the component allows for extremely detailed, intricate, and adaptive feature configurations. This technology increases the design space of the components and allows for a much higher degree of manufacturing robustness and adaptability.

In one example, the component 120 comprises an airfoil section 66 for a blade such as that shown in FIGS. 2-3. However, the component 120 could also comprise a vane, a BOAS, or a combustor liners or panels, for example, to further augment heat transfer as needed.

The subject invention provides an optimization of cooling holes exiting from a small cavity. The holes are orientated in such a way that all distances between adjacent holes are the minimum ligament distance. This allows many more holes to be included in the area, and can even provide for additional rows of cooling holes where in the past the only one row was achievable. The result is improved film coverage due to many more holes being available in the given area, as well as providing the necessary flow required for upstream internal cavity heat transfer. Correspondingly, there is improved turbine life and fuel burn reduction.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A cooling circuit for a gas turbine engine comprising:
a gas turbine engine component having a body with at least one internal cavity defined by a cavity wall, wherein the internal cavity is defined by a height and a width that is greater than the height, and wherein the height is within the range of 0.100-0.300 inches (2.54-7.62 mm); and
a plurality of cooling holes formed within the cavity wall, wherein each cooling hole is defined by a length extending from a cooling hole inlet to a cooling hole outlet, and wherein the cooling holes are positioned relative to each other such that a minimum allowable ligament distance is maintained between adjacent cooling holes along the entire length of each cooling hole, and wherein the minimum allowable ligament distance is at least 0.003 inches (0.076 mm) and not more than 0.050 inches (1.27 mm), and wherein each cooling hole as a diameter within a range of 0.010-0.030 inches (0.254-0.762 mm).

2. The cooling circuit according to claim 1 wherein each cooling hole has a uniform shape.

3. The cooling circuit according to claim 2 wherein the uniform shape comprises a cylindrical shape.

4. The cooling circuit according to claim 2 wherein each cooling hole defines a hole center axis and wherein the center axes are parallel to each other.

5. The cooling circuit according to claim 1 wherein each hole has a non-uniform shape.

6. The cooling circuit according to claim 5 wherein the non-uniform shape comprises a first portion at the cooling hole inlet that is defined by a first cross-sectional area and a second portion at the cooling hole outlet that is defined by a second cross-sectional area greater than the first cross-sectional area.

7. The cooling circuit according to claim 6 wherein each cooling hole defines a center axis, and wherein at least one center axis of one cooling hole is non-parallel to at least one center axis of another cooling hole.

8. The cooling circuit according to claim 6 wherein the cooling hole inlet of at least one cooling hole is axially aligned with the cooling hole outlet of the at least one cooling hole.

9. The cooling circuit according to claim 1 wherein the plurality of cooling holes includes at least a first row of cooling holes and a second row of cooling holes spaced from the first row of cooling holes.

10. The cooling circuit according to claim 9 wherein at least one cooling hole in the first row of cooling holes is oriented to extend in a first direction and at least one cooling hole in the second row of cooling holes is orientated to extend in a second direction different than the first direction.

11. The cooling circuit according to claim 1 wherein the gas turbine engine component comprises one of an airfoil, a blade, a vane, a BOAS, or a combustor panel.

12. A gas turbine engine comprising:
a compressor section;
a combustor section downstream of the compressor section; and
a turbine section downstream of the combustor section, and wherein at least one of the combustor section and the turbine section include a component having a body with at least one internal cavity defined by a cavity wall, and a plurality of cooling holes formed within the cavity wall, wherein the internal cavity is defined by a height and a width that is greater than the height, and wherein the height is within the range of 0.100-0.300 inches (2.54-7.62 mm), and wherein each cooling hole is defined by a length extending from a cooling hole inlet to a cooling hole outlet, and wherein the cooling holes are positioned relative to each other such that a minimum allowable ligament distance is maintained between adjacent cooling holes along the entire length of each cooling hole, and wherein the minimum allowable ligament distance is at least 0.003 inches (0.076 mm) and not more than 0.050 inches (1.27 mm), and wherein each cooling hole as a diameter within a range of 0.010-0.030 inches (0.254-0.762 mm).

13. The gas turbine engine according to claim 12 wherein the component comprises an airfoil, a combustor panel, or BOAS.

14. The gas turbine engine according to claim 12 wherein the plurality of cooling holes includes at least a first row of cooling holes and a second row of cooling holes spaced from the first row of cooling holes, and wherein at least one cooling hole in the first row of cooling holes is oriented to extend in a first direction and at least one cooling hole in the second row of cooling holes is orientated to extend in a second direction different than the first direction.

15. The gas turbine engine according to claim 12 wherein each cooling hole comprises a first portion at the cooling hole inlet that is defined by a first cross-sectional area and a second portion at the cooling hole outlet that is defined by a second cross-sectional area greater than the first cross-sectional area.

16. A method of forming a cooling circuit for a gas turbine engine comprising the steps of:

(a) providing a gas turbine engine component having a body with at least one internal cavity defined by a cavity wall, wherein the internal cavity is defined by a height and a width that is greater than the height, and wherein the height is within the range of 0.100-0.300 inches (2.54-0.762 mm); and (b) forming a plurality of cooling holes within the cavity wall, wherein each cooling hole is defined by a length extending from a cooling hole inlet to a cooling hole outlet; and (c) forming the cooling holes relative to each other such that a minimum allowable ligament distance is maintained between adjacent cooling holes along the entire length of each cooling hole, wherein the minimum allowable ligament distance is at least 0.003 inches (0.076 mm) and not more than 0.050 inches (1.27 mm), and wherein each cooling hole has a diameter within a range of 0.010-0.030 inches (0.254-0.762 mm).

17. The method according to claim 16 including forming at least two rows of cooling holes in the cavity wall.

18. The gas turbine engine according to claim 12 wherein each cooling hole has a variable cross-section.

19. The gas turbine engine according to claim 12 wherein the plurality of cooling holes includes at least a first row of cooling holes and a second row of cooling holes spaced from the first row of cooling holes.

20. The cooling circuit according to claim 1 wherein each cooling hole has a variable cross-section.

* * * * *

UNITED STATES PATENT AND TRADEMARK OFFICE
CERTIFICATE OF CORRECTION

| | | |
|---|---|---|
| PATENT NO. | : 10,247,011 B2 | Page 1 of 1 |
| APPLICATION NO. | : 14/923553 | |
| DATED | : April 2, 2019 | |
| INVENTOR(S) | : San Quach, Christopher King and Thomas N. Slavens | |

It is certified that error appears in the above-identified patent and that said Letters Patent is hereby corrected as shown below:

In the Claims

In Claim 1, Column 8, Line 46-47; replace "hole as a diameter" with --hole has a diameter--

In Claim 16, Column 10, Line 19; replace "(2.54-0.762 mm)" with --(2.54-7.62 mm)--

Signed and Sealed this
Twenty-fifth Day of January, 2022

Drew Hirshfeld
*Performing the Functions and Duties of the*
*Under Secretary of Commerce for Intellectual Property and*
*Director of the United States Patent and Trademark Office*